L. G. PALMER.
ELECTRIC SEAM WELDING APPARATUS.
APPLICATION FILED OCT. 24, 1918.
Patented May 27, 1919.
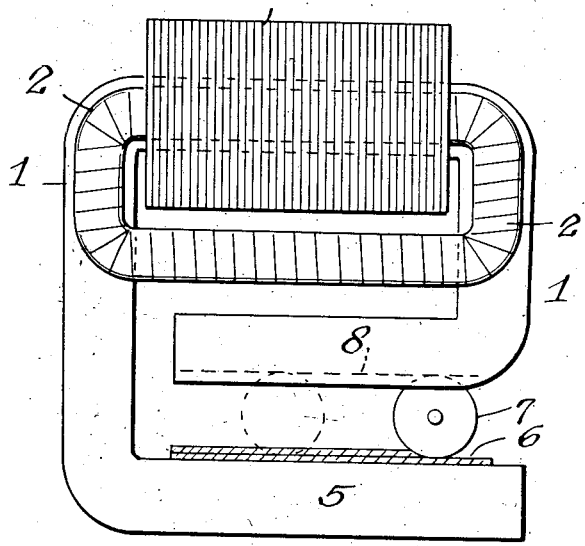
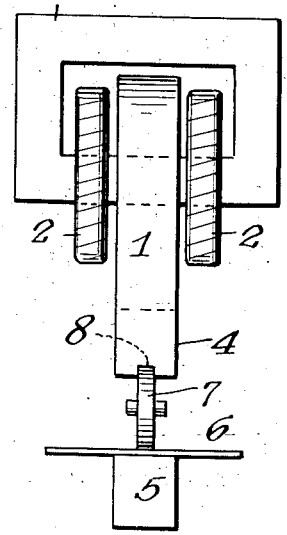
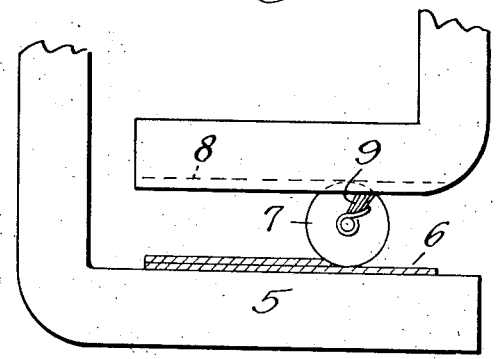
INVENTOR
Lindley Guy Palmer
BY
Townsend & Decker
ATTORNEYS

UNITED STATES PATENT OFFICE.

LINDLEY GUY PALMER, OF CINCINNATI, OHIO, ASSIGNOR TO THOMSON ELECTRIC WELDING COMPANY, OF LYNN, MASSACHUSETTS, A CORPORATION OF MASSACHUSETTS.

ELECTRIC SEAM-WELDING APPARATUS.

1,304,703.  Specification of Letters Patent.  Patented May 27, 1919.

Application filed October 24, 1918. Serial No. 259,497.

*To all whom it may concern:*

Be it known that I, LINDLEY GUY PALMER, a citizen of the United States, and a resident of Cincinnati, in the county of Hamilton and State of Ohio, have invented certain new and useful Improvements in Electric Seam-Welding Apparatus, of which the following is a specification.

My invention relates to apparatus for electric seam welding in which heating electric current of large volume but low potential is passed through the seam to be welded to bring the same up to the temperature requisite for the welding operation.

In electric seam welding apparatus as now commonly constructed and arranged, unsatisfactory results are obtained especially in welding seams of any appreciable length owing to the potential across the secondary terminals varying as the roller contact travels thereby lengthening the secondary circuit. Also the heating effect of the current varies at different points in the seam as more or less of the stock enters the gap of the machine, thereby creating a greater or less reactance.

The object of my invention is to overcome these objectionable features in seam welding by maintaining a practically constant difference of potential across the electrodes at all points of travel of the contact roller which makes the seam weld and to reduce the electric loss to a minimum.

To these ends the invention consists in the arrangement of electric seam welding apparatus hereinafter more particularly described and then specified in the claims.

In the accompanying drawings, Figure 1 is a diagrammatic illustration of a form of apparatus arranged in accordance with this invention.

Fig. 2 is an end elevation of the same.

Fig. 3 illustrates a modification.

Referring to the drawings, the copper casting or heavy mass of copper forming the secondary of the welding transformer is indicated at 1. Said copper mass or casting may be of any form desired and may have a primary 2 and a laminated iron core 3 disposed with relation to the secondary and to one another in any of the ways ordinarily practised in the art.

4, 5 indicate a pair of heavy copper bars forming terminal bars of the secondary and united with the casting 1 integrally or otherwise. The said terminal bars 4, 5 extend in opposite directions from the casting 1 but parallel to one another leaving a gap between them for insertion of the work.

The work which may be in the form of a lapped seam employed to unite two plates of metal on the lapped edges of a tube or cylinder is indicated at 6 and is preferably supported in any desired manner on the lower terminal bar 5.

7 indicates a contact roller of copper or other good conducting material. The said contact roller bridges the gap between the terminal bars 4, 5 and is progressively fed along the length of the seam to be welded in any suitable manner as will be readily understood by those skilled in the art.

The roller 7 preferably runs in a guiding groove 8 formed in the bar 4, electrical contact being maintained in any suitable manner as by keeping surface contact therewith or by a conducting brush 9 as indicated in Fig. 3. In making the weld, the contact roller travels along the seam 6 and at each progressive point of contact the circuit across the gap being completed by the roller 7, the current heats the work and the same is welded in the usual and well known manner. As shown in Fig. 3, the brush 9 wipes along the underside of the bar 4 and positively conducts the current to the roller 7. A coiled spring around the pivot of the brush which for convenience may be the shaft of the roller 7, may be employed to keep a good contact with the bar 4 as well as assist in applying pressure to the seam by means of the roller.

By arranging the terminal bars 4, 5 as shown and so that they extend in opposite directions as indicated, the difference of potential across the gap between the bars at any one point of travel of the roller 7 will be the same as at all other points, since any drop of potential at the point of contact of the roller with the bar 4 due to its greater distance from the point or portion of the secondary from which the bar 4 extends will be compensated for by the lesser drop of potential at its opposite point of contact with the work on the bar 5, which point as will be seen is correspondingly nearer to the portion or part of the secondary circuit from which the bar 5 extends—in other words the length of the secondary circuit at all points in the travel of the roller 7 is the same.

Also it will be observed that due to the arrangement shown and described the reactance existing in other arrangements due to a great length of work being located in the magnetic gap is practically eliminated.

It will be understood that the drawings merely illustrate the principle of the invention and that the same may be embodied in any desired construction or arrangement of electric seam welding apparatus, the details of which are now well known and understood in the art.

What I claim as my invention is:—

1. In an electric seam welding apparatus, a pair of transformer secondary terminal bars extended parallel to one another but in opposite directions and a work-engaging contact roller adapted to travel progressively in the space between said bars and complete the electric circuit therebetween.

2. In an electric seam welding apparatus, a pair of transformer secondary terminal bars extended parallel to one another but in opposite directions, one of said bars forming a work support and a contact roller adapted to progressively engage the seam to be welded and maintain electric connection with the other bar.

3. In an electric seam welding apparatus, a pair of transformer secondary terminal bars extended parallel to one another but in opposite directions, one of said bars forming a work support, a roller contact adapted to progressively travel in the space between said bars and means for maintaining electric connection between said roller and said bars as the roller travels as and for the purpose described.

Signed at Cincinnati in the county of Hamilton and State of Ohio this eighteenth day of October A. D. 1918.

LINDLEY GUY PALMER.

Witnesses:
WALTER A. PATSCHEIDER,
W. J. OVERBECK.